E. Oliver,

Animal Trap.

No. 111,771. Patented Feb. 14, 1871.

Witnesses:
Chas Nida
L. S. Mabee

Inventor:
E. Oliver
per Munn & Co.
Attorneys.

United States Patent Office.

EBENEZER OLIVER, OF NEW YORK, N. Y.

Letters Patent No. 111,771, dated February 14, 1871.

IMPROVEMENT IN ANIMAL-TRAPS.

The Schedule referred to in these Letters Patent and making part of the same.

*To all whom it may concern:*

Be it known that I, EBENEZER OLIVER, of the city, county, and State of New York, have invented a new and useful Improvement in Animal-Trap; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to improve the construction of rectangular wire animal traps, so as to make them stronger, more durable, less liable to get out of order, less liable to frighten the animal trapped for, and more convenient in use; and It consists in the construction and combination of the various parts of the trap, as hereinafter more fully described.

A is the body of the trap, which is made of wire in the ordinary manner, and which may be attached to a wooden bottom, B, or to a wire bottom, or may be made without a bottom, as may be desired.

C is the door, which is hinged to a wire, a', extending across the upper part of the open end of the body or box A.

D is a strong wire spring, coiled around the wire a'.

One end of the spring D is secured to the box A, and its other end is secured to the door C.

The door C is arranged to swing inward, and the spring D is so arranged as to throw it shut as soon as released from the tripping or setting device.

The door C is held closed by the force of the spring D and by the spring-catch E attached to the bottom B, and which is so formed as to be pushed down by the door C when said door swings shut, and to at once rise again to its place as soon as the door has passed.

The door C is stopped in the proper position and kept from being forced outward by the force of the spring D, or by the entrapped animals by the wires F, the lower ends of which are attached to the bottom B at a little distance from the sides of the body or box A.

Figure 2:
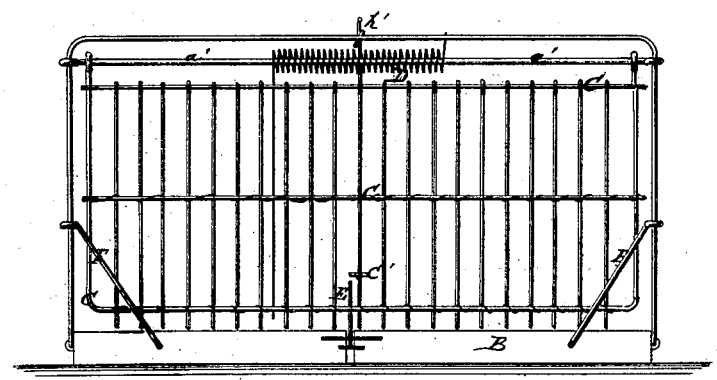
Figure 2 is a front end view of the same.

The upper ends of the wires F are attached to the forward ends of the sides of the body or box A, as shown in fig. 2, so that the corners of the door, when closed, will strike against the wires F, and be securely supported.

The lower ends of the vertical wires of the door C project below the lower cross-wire of said door, and are made pointed, so that, should an entrapped animal succeed in partially raising the door C, the said wires will stick into him and prevent him from forcing his way out.

Figure 1:
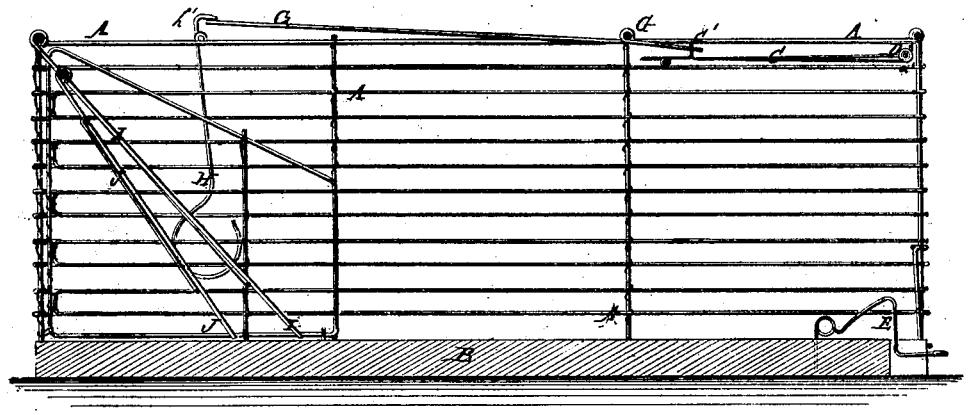
Figure 1 is a detail vertical longitudinal section of my improved trap.

G is a lever, which is pivoted near its forward end to a cross-wire of the top of the box or body A, in such a position that its forward end may be passed through a loop, c', formed upon the rear or inner side of the door C in the middle of its lower part, when said door is raised to lie along the under side of the top of the body or box A, as shown in fig. 1.

The rear end of the lever G extends back so that in setting the trap it may be passed beneath a hook, h', formed upon the upwardly-projecting end of the said hook H, as shown in fig. 1.

The bait-hook H is pivoted to the rear part of the top of the body or box A, and its lower or hooked end projects downward nearly to the bottom of the trap.

In the rear end or side of the box or body A is formed an opening, which is closed by the drop-doors or gates I J, which are so made that when their lower ends rest upon the bottom B, they will be in an inclined position, the lower end of the gate I resting upon the bottom of the box A, a little in front of the lower end of the other gate J.

The upper end of the door I is pivoted to the top of the box A, and the upper end of the door J is pivoted to the upper part of the gate or door I.

The opening at the inner side edges of the inclined doors or gates I J is closed by a fence in the ordinary manner.

By this construction an animal can easily raise the gates I J and pass into the trap; but should an entrapped animal, in seeking to escape, succeed in raising the gate I he will find it impossible to raise the other gate J.

A trap thus constructed, while being easily and conveniently manipulated and effective in operation, will present no projecting parts to frighten the animals away from the trap, and will have no springs liable to get out of order.

Having thus described my invention,

I claim as new and desire to secure by Letters Patent—

1. The door C of a rectangular wire trap A, arranged to swing inward, and provided with a spring, D, spring catch E, and stops F, substantially as herein shown and described and for the purpose set forth.

2. The setting and tripping devices consisting of the pivoted lever G and pivoted bait-hook H h', in combination with the body or box A and spring door C D, substantially as herein shown and described, and for the purposes set forth.

3. As an improvement in the double doors of animal-traps, the connected doors I J, hung from the same pivoting points, as and for the purpose specified.

The above specification of my invention signed by me this 10th day of December, 1870.

EBENEZER OLIVER.

Witnesses:
 JAMES T. GRAHAM,
 GEO. W. MABEE.